G. A. ANDERSON.
STEERING MECHANISM FOR ROAD ENGINES.
APPLICATION FILED DEC. 20, 1909.
990,794.
Patented Apr. 25, 1911.
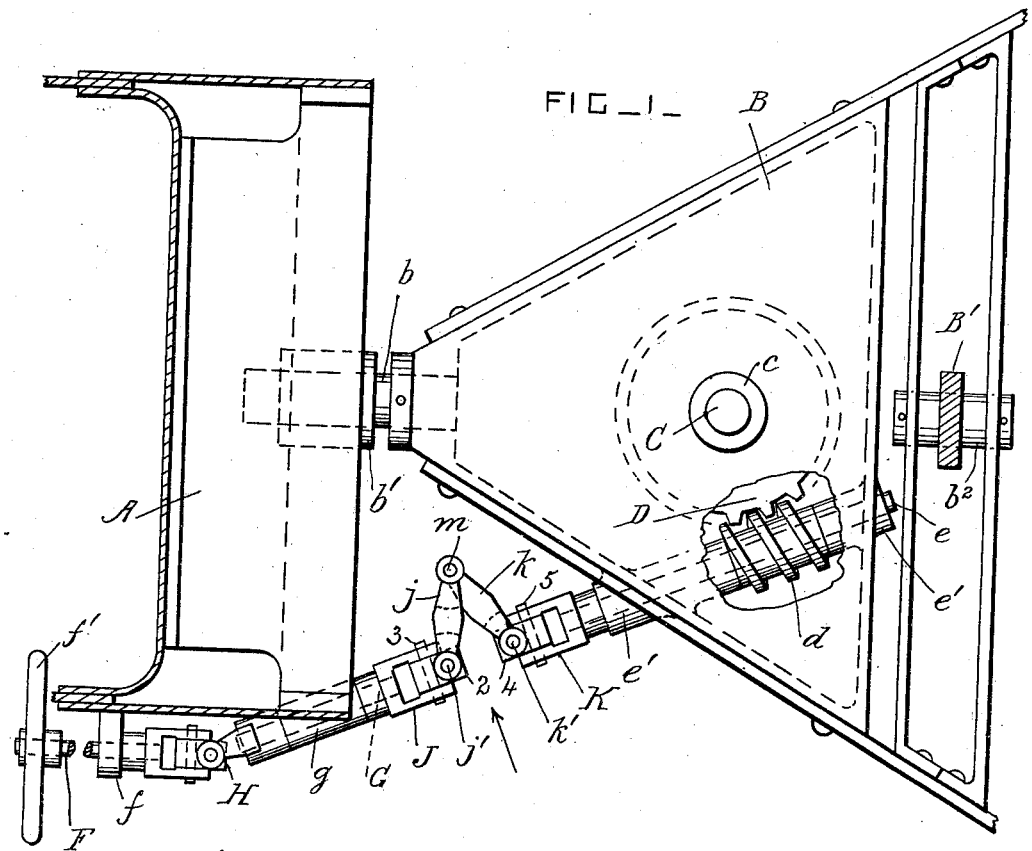
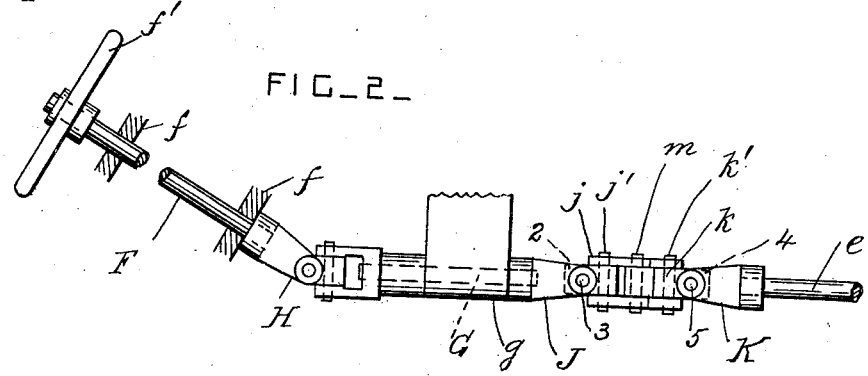

UNITED STATES PATENT OFFICE.

GUSTAF ARVID ANDERSON, OF WAYNESBORO, PENNSYLVANIA, ASSIGNOR TO THE GEISER MANUFACTURING COMPANY, OF WAYNESBORO, PENNSYLVANIA.

STEERING MECHANISM FOR ROAD-ENGINES.

990,794.

Specification of Letters Patent. Patented Apr. 25, 1911.

Application filed December 20, 1909. Serial No. 534,041.

*To all whom it may concern:*

Be it known that I, GUSTAF ARVID ANDERSON, a citizen of the United States, residing at Waynesboro, in the county of Franklin and State of Pennsylvania, have invented certain new and useful Improvements in Steering Mechanism for Road-Engines; and I do hereby declare the following to be a full, clear, and exact description of the invention, such as will enable others skilled in the art to which it appertains to make and use the same.

This invention relates to means for operating the steering shaft of a road engine, by hand, and from a distance; and it consists in the novel construction and combination of the parts hereinafter fully described and claimed.

In the drawings, Figure 1 is a plan view of the steering mechanism. Fig. 2 is a side view of a portion of the steering mechanism looking in the direction of the arrow in Fig. 1.

A is a portion of a stationary frame which is secured to or which forms a portion of the boiler of a road roller.

B is a portion of a rocking frame which supports the steering shaft C and other portions of the steering mechanism. This frame B has a horizontal pivot $b$ at one end which is journaled in a bearing $b'$ on the frame A. The frame B has also a pivot $b^2$ arranged axially in line with the pivot $b$, and engaging with a stationary bracket B' arranged on the other side of the steering shaft C from the pivot $b$. The frame B is free to rock or oscillate on its horizontal pivots, and it is also free to slide longitudinally to some extent.

C is the driven-shaft or steering-shaft which is journaled in bearings $c$ on the movable frame B and arranged crosswise of the pivot $b$. The means for connecting the steering road-wheel at the front end of the road-roller with the steering-shaft C are not shown, as they are of any approved kind.

D is a worm-wheel secured on the shaft C, and $d$ is a worm secured on a shaft $e$ which is journaled in bearings $e'$ on the frame B. The worm gears into the worm-wheel, and the shaft $e$ is arranged diagonally of the axis of the pivot $b$ on which the frame B is movable.

F is the driving shaft which is journaled in bearings $f$ secured to the stationary frame A. The driving shaft F is arranged in a vertical plane parallel to the vertical plane of the axis of the pivot $b$, and it is inclined with respect to the horizontal, but the driving shaft may be arranged in any other convenient position. The driving shaft is provided with a hand-wheel $f'$ or other suitable means for revolving it.

G is an intermediate shaft journaled in a bearing $g$ secured to the stationary frame A. This shaft is arranged substantially on the axis of the shaft $e$, but its exact position is not material.

H is a universal joint or coupling of approved construction which connects one end portion of the shaft G with the adjacent end portion of the shaft F.

J is a universal coupling-member secured to the other end of the shaft G; and K is a universal coupling-member secured to the shaft $e$. The two coupling-members J and K are not connected direct to each other, but are coupled by two links $j$ and $k$ pivoted to them by pins $j'$ and $k'$ respectively. The two links $j$ and $k$ are normally arranged at an acute angle to each other and they are pivoted together by a pin $m$. The universal coupling-member J has a block 2 which is pivoted to its main portion by a pin 3, and the pin $j'$ engages with the block 2, and is arranged at a right-angle to the pin 3. The universal coupling-member K has a block 4 which is pivoted to its main portion by a pin 5, and the pin $k'$ engages with the block 4, and is arranged at a right-angle to the pin 5.

This construction permits the steering-shaft C to be operated by revolving the hand-wheel, and it permits the movable frame B to be rocked on its pivot and slid back and forth longitudinally while the shafts are in motion. When the frame B turns from the horizontal, the shaft $e$ is moved out of alinement with the shaft G; the blocks 2 and 4 turn on their pins 3 and 5, and the motion is transmitted through the links $j$ and $k$ which preserve the connection of the universal coupling-members J and K.

What I claim is:

1. In a steering mechanism, the combination, with stationary supports, of a rocking frame provided with pivots arranged horizontally and in line with each other and engaging with the stationary supports, a steering shaft journaled in the rocking frame crosswise between the said pivots, an intermediate shaft carried by one of the stationary supports and arranged at an angle to the axis of the said pivots, an operating shaft journaled in the rocking frame and normally arranged in line with the said intermediate shaft, universal coupling-members secured on the adjacent end portions of the operating shaft and the intermediate shaft, links pivoted together and to the said universal coupling-members, and driving mechanism connecting the operating shaft with the steering shaft.

2. In a steering mechanism, the combination, with stationary supports, of a rocking frame provided with pivots arranged horizontally and in line with each other and engaging with the stationary supports, a steering shaft journaled in the rocking frame crosswise between the said pivots, an intermediate shaft carried by one of the stationary supports and arranged at an angle to the axis of the said pivots, an operating shaft journaled in the rocking frame and normally arranged in line with the said intermediate shaft, universal coupling-members secured on the adjacent end portions of the operating shaft and the intermediate shaft, links pivoted together and to the said universal coupling-members, a driving shaft provided with a hand wheel and arranged at angles to the intermediate shaft both vertically and horizontally and carried by one of the said stationary supports, universal coupling-members connecting the hand wheel shaft with the said intermediate shaft, and driving mechanism connecting the operating shaft with the steering shaft.

In testimony whereof I have affixed my signature in the presence of two witnesses.

GUSTAF ARVID ANDERSON.

Witnesses:
DANIEL S. BEARD,
H. E. KUHNER.

---

Copies of this patent may be obtained for five cents each, by addressing the "Commissioner of Patents, Washington, D. C."